United States Patent

[11] 3,602,483

[72] Inventors George K. Russell
Castle Rock;
Ronald L. Criley, Evergreen; Richard H. Frost, Littleton, all of, Colo.
[21] Appl. No. 838,759
[22] Filed July 3, 1969
[45] Patented Aug. 31, 1971
[73] Assignee Frost Engineering Development Corporation
Englewood, Colo.

[54] LOAD-LOWERING DEVICE
2 Claims, 4 Drawing Figs.
[52] U.S. Cl. .................................................. 254/157,
254/154, 254/159, 188/184, 74/547
[51] Int. Cl. ...................................................... B66d 5/04,
B66d 5/18
[50] Field of Search ............................................ 254/157,
154, 159; 188/184, 185; 242/75.47, 156.2, 156,
107.3; 74/543, 547; 70/422

[56] References Cited
UNITED STATES PATENTS
522,990  7/1894  Kopp ............................ 254/154
641,705  1/1900  Koenig .......................... 254/159
715,691  12/1902  Porter ........................... 254/157
785,526  3/1905  Simpson ........................ 70/422
1,655,744  1/1928  Swanby ......................... 74/543
2,633,956  4/1953  Thostenson .................... 188/184

FOREIGN PATENTS
22,363  8/1907  Great Britain ................. 254/159
1,387,704  2/1920  Great Britain ................. 254/159

Primary Examiner—Harvey C. Hornsby
Assistant Examiner—Merle F. Maffei
Attorney—Anderson, Spangler & Wymore ABSTRACT: This invention relates to an automatically braked load-lowering device wherein the free end of the load line is secured to an overhead support and payed off the rotating hub of a reel that descends with the load suspended therebeneath. One or more brake shoes are pivotally attached to the outside of the single reel flange for movement against a stationary brake drum under the influence of both centrifugal force and a positive spring bias. A handle for use by human loads is stowed in telescoped position between a pair of spaced abutments forming a part of the reel housing and, when pulled free of the latter, the handle extends due to spring bias between its telescoped elements so as to form a two-hand grip.

PATENTED AUG 31 1971 3,602,483
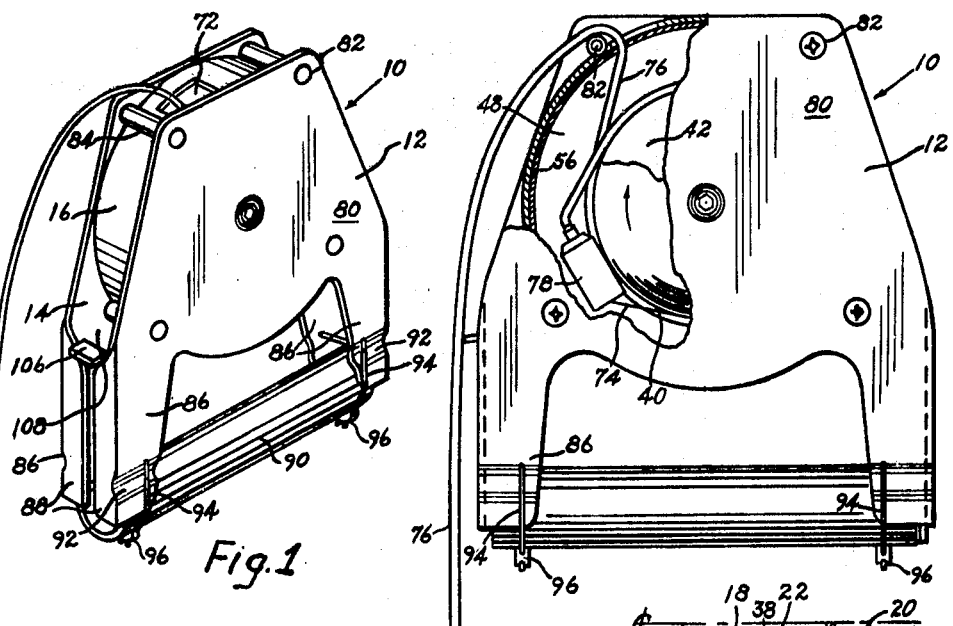
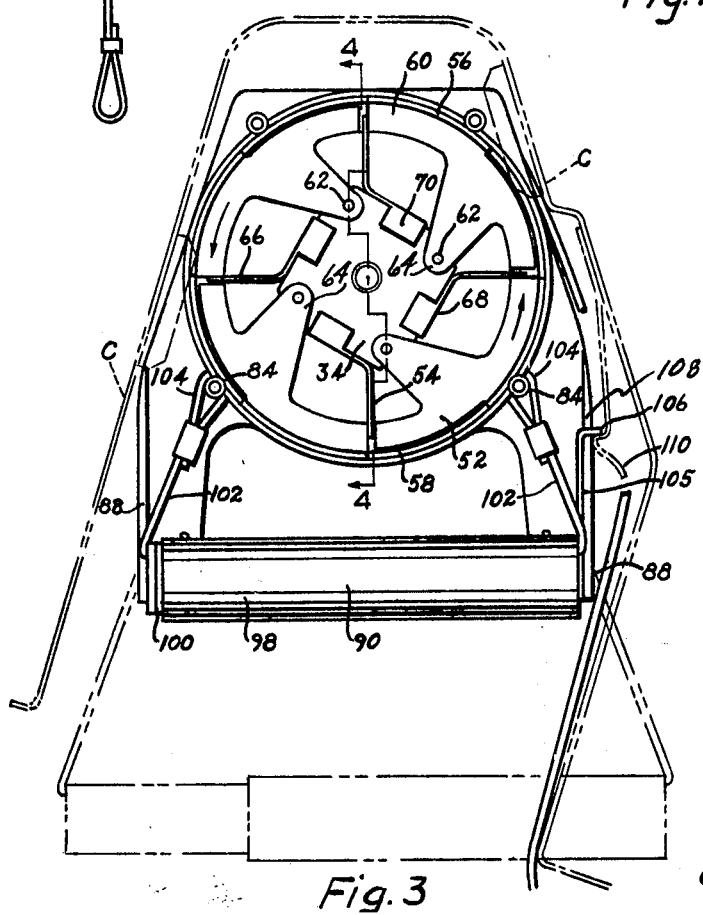
INVENTORS
GEORGE K. RUSSELL
RONALD L. CRILEY
RICHARD H. FROST

LOAD-LOWERING DEVICE

The load-lowering apparatus of the present invention, while capable of controlling the rate of descent of most any size or type of load suspended therefrom is primarily designed for lowering human beings to the ground from elevated positions in or on the fuselage of a disabled aircraft and, for this reason, it includes a number of unique features which differentiate it from the prior art braked reel units. For instance, those utilizing a cable instead of a flat ribbon or tape require an excessive amount of space in order to store the 30 to 40 feet of cable needed for the passengers and crew to reach all the way to the ground. Also, the skin of the aircraft fuselage will, more often than not, be ruptured and torn producing jagged edges that are more likely to sever a cable than a tape.

The probability of fire demands that the unit be fabricated in its entirety from some material, probably metal, that is relatively unaffected by the maximum temperatures likely to be encountered in a burning aircraft. Since one would expect that a device of this type might well never be used or, at most, only once, it is imperative that it be fabricated of a material which does not deteriorate with age and this, once again, suggests an all metal construction because of its long term, near constant reliability.

It is also important that the reeling device move with the user rather than stay with the aircraft so as to minimize relative movement between the tape and torn fuselage. In so doing and also to minimize need for instruction, the user must be prevented from exercising control over his rate of descent; otherwise, serious delays in the evacuation procedure and even collisions between successive evacuees would likely result. If, on the other hand, one is going to deny the user the right to control his rate of descent, provision must be made for automatically keeping this rate beneath a predetermined safe maximum regardless of the load.

Keeping the area clear of evacuees at both the beginning and the end of the evacuation procedure suggests the use of a simple gripable handle of some type rather than a harness that has to be fastened and unfastened although a harness can be attached to the handle. Since a two-hand grip is far better than one, especially in the case of a weak or injured escapee or the consequences of a brake jam in middescent, the handle should be long enough to accommodate both hands of a user. With space at a premium in any aircraft, its use must be conserved and only a minimal amount can be allotted to escape devices such as that forming the subject matter hereof that will probably never be deployed, especially if they constitute a backup escape system rather than the primary one.

It has now been found in accordance with the teaching of the instant invention that the foregoing and other desirable ends can be achieved with a relatively small, compact and lightweight centrifugally and self-energized spring braked reel of metal ribbon or tape having an extendable telescoped handle stored in retracted position between a pair of spaced abutments on the lower end of the reel case and sealed therebetween by means of pressure-sensitive tape or the like. Pulling the handle free of the abutments permits automatic extension thereof to a length sufficient to receive both hands. As the ribbon pays off the reel, pivoted brake shoes carried thereby extend centrifugally into contact with a stationary brake drum forming a part of the case and thus limit the maximum rate of descent to a predetermined level for a load of given weight. Provision is made for keeping the tape or ribbon tightly coiled so that no slack must be taken up prior to the commencement of reel rotation and the centrifugal braking action that is a function of the latter. Provision is also made for rewinding the payed out tape for reuse.

It is, therefore, the principal object of the present invention to provide a novel and improved load lowering device of a type especially adapted for use in evacuating the passengers and crew from a disabled aircraft.

A second objective is the provision of a device of the type aforementioned which is fabricated entirely of metal parts and is thus essentially fireproof as well as being possessed of long term, near maximum shelf life and reliability.

Another object of the invention herein disclosed and claimed is the provision of an extendable hand gripped type of descent device that eliminates the need for fastening and unfastening a harness so as to speed up the evacuation procedure while keeping the landing area clear of evacuees.

Still another objective is to provide an automatically braked load-lowering apparatus which takes the control over the rate of descent away from the passenger yet holds the maximum rate for even a heavy person well within the limit considered safe for a parachute landing.

Further objects are to provide emergency aircraft escape apparatus which is rugged, lightweight, compact, versatile, easy to operate, inexpensive, foolproof, of simple construction, and even decorative in appearance.

Other objects will be in part apparent and in part pointed out specifically hereinafter in connection with the description of the drawings that follows, and in which:

FIG. 1 is a perspective view of the load-lowering device as seen from a point above and to the left thereof;

FIG. 2 is a side elevation to a slightly enlarged scale, portions of the near sideplate having been broken away to expose the interior construction;

FIG. 3 is an elevation showing the opposite side of the unit with the sideplate removed, and broken lines indicating the deplayed position of the handle and the design of a suitable storage compartment therefor; and, FIG. 4 is a fragmentary section to a further enlarged scale taken along line 4–4 of FIG. 3.

Referring now to the drawings for a detailed description of the present invention, it will be seen that the load-lowering device has been broadly designated by reference numeral 10 and that it includes a pair of sideplates 12 and 14 held in fixed spaced substantially parallel relation by a hollow cylindrical ring 16, a portion of the interior surface of which forms a stationary brake drum. A shaft 18 is mounted for rotation so as to extend between the sideplates with its axis of rotation colinear with the centerline of the brake drum ring 16. At least one end of shaft 18 is preferably left exposed and provided with a hexagonal socket or similar key 20 adapted to receive an Allen wrench or other suitable tool to be used for manual rotation thereof. The hub 22 of a reel 24 is pinned or otherwise attached to shaft 18 for conjoint rotation therewith within the confines of brake drum ring 16.

In the particular form illustrated in FIG. 4, the sideplates 12 and 4 contain transversely aligned apertures 26 into which are inserted internally flanged sleeve bearings 28 and 30. Shaft 18 is of the hollow cylindrical sleeve type plugged at one end with a plug 32 containing the hexagonal socket 20. Of course, the socket or key can be made an integral part of shaft 18 by forming the end thereof into a hexagonal shape rather than inserting plug 32 therein.

In FIGS. 3 and 4 of the drawings it will be noted that one end of the reel hub 22 is provided with an integral flange 34 which, in the particular form shown in FIG. 3, is square although it could just as well be some other shape. Abutting the inside surface of this integral flange 34 is a circular separator disc 36 that has a central opening 8 (FIG. 4) therein adapted to receive the reel hub therethrough. The latter flange separator disc 36 is frictionally attached to drum 16 and forms a stationary flange which functions to both support one side of the metal ribbon or tape 40 closely coiled around the hub and to separate the tape compartment from the brake compartment. A fluidtight seal therebetween (not shown) may be used if desired. The opposite or outside face of the coiled tape 40 rides against either sideplate 12 directly or, in the preferred form shown in FIG. 4, against a stationary inwardly offset rub plate 42, which is fastened to sideplate 12. While on the subject of rub plate 42, it is appropriate to mention the inwardly directed stops 46 (FIG. 2) carried on the periphery thereof that engage the outermost coil of tape and prevent it from unwinding too far. Actually, the stop is located to permit the coil to assume a loose-wound condition which is desirable because, when the load is applied, the coil rewinds and eliminates any abrupt shock while the friction developed between the coils thereof limits the rate of descent to a level well below that at which the braked drum is allowed to pay off tape after the coil is tightly wound thereon.

Circular disc 36 essentially divides the interior of the case into a tape compartment 48 and a brake compartment 50 which, as aforementioned, may be sealed from one another, the latter compartment containing the rectangular integral flange 34 to which the brake shoes 52 and the leaf springs 54 are attached. These springs normally bias the shoes carrying brake lining 56 into frictional engagement with the inside of the brake drum 16 in a manner that will be discussed in detail presently.

Brake shoes 52 are arcuate and, as illustrated, they subtend an angle of slightly less than 90°. Also, the trailing edge 58 of the shoe is preferably cut away slightly as shown in FIG. 3 so that the surface of the leading edge 60 thereof is all that frictionally engages the brake drum 16. Each shoe is pivotally attached to a corner of the square flange 34 by pivot pin 62 passing through the free ends of a bifurcated mounting arm 64. The axis of pivotal movement defined by pivot pin 62 is displaced well to the rear of the radial line bisecting the arc subtended by the shoe as viewed in FIG. 3, the direction of rotation being counterclockwise as indicated by the arrow. Thus, each shoe has an eccentrically located pivot such that the surface of the leading edge 60 will swing out into engagement with the brake drum 16 both by reason of the centrifugal forces acting thereon when the reel is turning to pay out tape and also because of the spring force applied radially by spring 54.

Springs 54 are generally L-shaped so that in an unloaded condition, the legs 66 and 68 thereof are disposed at approximately right angles or less to one another. Then, when preloaded as shown in FIG. 3, leg 66 is spring counterclockwise until it occupies an angular relation to its companion leg 68 of more like 120° and extends more or less radially with reference to the axis of reel rotation. Leg 68 extends along the planar side of the square flange 34 to which it has been shown fastened by integral downturned ears 70.

In FIG. 1 it will be noted that the hollow cylindrical brake drum element 16 contains an opening 72 in the top of the unit offset laterally so as to open only into the tape compartment 48 while leaving the brake compartment closed. In the particular form illustrated herein, the free end 74 of the tape is connected to a short length of cable 76 by means of a connector 78. The cable offers certain advantages in terms of being more easily bent and twisted to reach a point of attachment inside the aircraft than would be the case with the metal tape although, obviously, there would be many applications in which the connection could be made directly with the tape.

Sideplates 12 and 14 are essentially mirror images of one another and each has a generally trapezoidal body portion 80 that encloses the reel and brake compartments. The corners of the body that project beyond the brake drum 16 are fastened together by bolts 82 that pass through sleeve spacers 84. Removal of the sideplates and disassembly of the unit is thus facilitated without having to weld or otherwise permanently fasten the brake drum to the sideplates.

Fabricated as an integral part of the sideplates are a pair of arms 86 that each include inturned flanges 88 which cooperate with one another to define spaced substantially parallel abutments adapted to hold the handle 90 in telescoped relation ready for use. In the preferred embodiment shown, the arms 86 are dimpled as shown at 92 to provide stops limiting the extent to which the handle can move upwardly therebetween. A pair of wires 94 passing between the opposed arms 86, across the top of the handle 90 and down underneath the latter serve to hold it in place when the free ends of said wire are secured by frangible lead seal 96. Of course, various other types of well-known holding means and removable seals can be substituted for the one just described such as, for example, a detent arrangement and/or a short strip of adhesive tape passed around the bottom of the handle.

In FIGS. 3 and 4 it will be noted that handle 90 is of the telescoping type including two tubular sections 98 and 100 spring biased into the extended position shown by broken lines in FIG. 3. Obviously, as soon as the handle is pulled from between the abutments 88 holding it in telescoped relation, it will assume the aforementioned extended position and be held therein by suitable arrestment means, not shown. The handle remains attached to the rest of the unit by cables 102, the opposite extremities of which are provided with loops 104 that encircle and fasten onto the sleeves 84 located thereabove holding the sideplates in assembled relation. The excess cable needed to permit the handle to both drop down and assume its extended broken line position of FIG. 3 is, of course, stored inside thereof when telescoped. If desired, the two telescoping handle sections may be provided with detent stops (not shown) in accordance with well-known prior art techniques to limit the extended position thereof rather than using the cable for this purpose.

Finally, it will be seen than an L-shaped leaf spring latch 105 is mounted inside one set of the inturned abutment forming flanges 88 so that an ear 106 projects out through the slot 108 left therebetween. This ear 106 is designed to releasably hook behind a similarly shaped spring latch 110 shown in broken lines in FIG. 3 that forms a part of the storage compartment, a representative configuration of which has been shown by the broken lines in FIG. 3 and identified by the letter C, to secure the load-lowering device in the storage compartment for ready removal and use.

We claim:

1. The load-lowering device which comprises: a housing including a pair of sideplates fastened in fixed spaced parallel relation; reel-forming means journaled for rotation within the housing about a transverse axis extending normal to the sideplates, said means including a hub and a disclike flange mounted in said housing intermediate said sideplates so as to divide the housing into a tape compartment and a brake compartment; a hollow cylindrical member held between the sideplates enclosing the tape and brake compartments in coaxial relation with the reel-forming means, said member including an opening communicating the interior of the tape compartment; a flexible tape wound upon that portion of the hub within the tape compartment with the inner end thereof fastened thereto and the outer end emerging onto the exterior of the housing through the opening in the hollow cylindrical member; one or more brake shoes pivotally attached to that portion of the hub within the brake compartment for rotational movement therewith, each of said shoes including an arcuate section positioned and adapted to engage the inner surface of the hollow cylindrical member within the brake compartment so as to retard the reel-forming means upon rotation thereof in a direction to unwind the tape; and, handle-forming means attached to the housing for movement therewith opposite the point at which the tape emerges therefrom in which: spring means are carried by the reel-forming means for rotational movement therewith, said spring means including a portion within the brake compartment engaging a shoe so as to normally bias the leading edge thereof into sliding engagement against the inner surface of the hollow cylindrical element when said reel-forming means is at rest and is rotated in the direction to unwind the tape.

2. The load-lowering device which comprises: a housing including a pair of sideplates fastened in fixed spaced parallel relation; reel-forming means journaled for rotation within the housing about a transverse axis extending normal to the sideplates, said means including a hub and a disclike flange mounted in said housing intermediate said sideplates so as to divide the housing into a tape compartment and a brake compartment; a hollow cylindrical member held between the sideplates enclosing the tape and brake compartments in coaxial relation with the reel-forming means, said member including an opening communicating the interior of the tape compartment; a flexible tape wound upon that portion of the hub within the tape compartment with the inner end thereof fastened thereto and the outer end emerging onto the exterior of the housing through the opening in the hollow cylindrical member; one or more brake shoes pivotally attached to that portion of the hub within the brake compartment for rotational movement therewith, each of said shoes including an arcuate section positioned and adapted to engage the inner surface of the hollow cylindrical member within the brake compartment so as to retard the reel-forming means upon rotation thereof in a direction to unwind the tape; and, handle-forming means attached to the housing for movement therewith opposite the point at which the tape emerges therefrom in which: the axis of pivotal movement of each brake shoe is displaced rearwardly toward the trailing edge thereof a sufficient distance such that centrifugal force acting thereon due to rotation of the reel-forming means will urge the leading edge into sliding engagement against the hollow cylindrical member in which: spring means are mounted on the reel-forming means for rotational movement therewith, said spring means having a portion thereof engaging one of the brake shoes operative to bias same rearwardly about its axis of pivotal movement during both rotation and nonrotation of said reel while maintaining sliding engagement of said brake shoes with the hollow cylindrical member.